United States Patent
Li

(10) Patent No.: US 8,107,506 B2
(45) Date of Patent: Jan. 31, 2012

(54) METHOD AND APPARATUS FOR REDUCING SERVICE IMPAIRMENT IN LINK AGGREGATION GROUP

(75) Inventor: Jingtao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 12/506,580

(22) Filed: Jul. 21, 2009

(65) Prior Publication Data

US 2009/0279564 A1 Nov. 12, 2009

Related U.S. Application Data

(63) Continuation of application No. PCT/CN2008/000155, filed on Jan. 22, 2008.

(30) Foreign Application Priority Data

Jan. 22, 2007 (CN) .......................... 2007 1 0001192

(51) Int. Cl.
*H04J 3/22* (2006.01)
(52) U.S. Cl. ....................................... 370/544; 370/536
(58) Field of Classification Search .................. 370/229, 370/230, 230.1, 232, 234, 235, 252, 253, 370/360, 366, 389, 474, 536, 542, 543, 544
See application file for complete search history.

(56) References Cited

U.S. PATENT DOCUMENTS

| | | | |
|---|---|---|---|
| 6,646,991 B1 | 11/2003 | Drottar et al. | |
| 6,934,293 B1 | 8/2005 | DeJager et al. | |
| 2004/0042502 A1* | 3/2004 | Drottar et al. | 370/509 |
| 2005/0160171 A1* | 7/2005 | Rabie et al. | 709/227 |
| 2006/0039384 A1 | 2/2006 | Sitaram et al. | |
| 2006/0098573 A1 | 5/2006 | Beer et al. | |
| 2007/0206501 A1* | 9/2007 | Alesi et al. | 370/235 |
| 2008/0151890 A1* | 6/2008 | Zelig et al. | 370/390 |

FOREIGN PATENT DOCUMENTS

CN 1366402 A 8/2002

(Continued)

OTHER PUBLICATIONS

International Search Report from P.R. China in International Application No. PCT/CN2008/000155 mailed Apr. 3, 2008.

(Continued)

*Primary Examiner* — Ricky Ngo
*Assistant Examiner* — Wei-Po Kao
(74) *Attorney, Agent, or Firm* — Finnegan, Henderson, Farabow, Garrett & Dunner LLP

(57) ABSTRACT

A method and apparatus for reducing service impairment in a LAG are provided. The method includes: dividing a service packet into multiple service sub-flows, and allocating the multiple service sub-flows to all the physical ports averagely; after a new port is added, configuring a preset quantity of service sub-flows for the new port; or, after a port is deleted, allocating the service sub-flows on the deleted port to other ports; and finding a forwarding physical port through a service packet according to the service sub-flows. An apparatus for reducing service impairment in a LAG includes: an initializing module, a new port processing module or a deleted port processing module, and a forwarding port search module. In the case of adding or deleting a port, only the affected service sub-flows are operated, thus minimizing the impact.

10 Claims, 4 Drawing Sheets

FOREIGN PATENT DOCUMENTS

| | | |
|---|---|---|
| CN | 1553654 A | 12/2004 |
| CN | 1571354 A | 1/2005 |
| CN | 1725761 A | 1/2006 |
| CN | 101014005 | 8/2007 |
| CN | 101014005 A | 8/2007 |
| EP | 1 713 213 A1 | 10/2006 |

OTHER PUBLICATIONS

European Search Report dated Jul. 27, 2010, issued in EP 08 70 0704.3, 7 pages.

English Translation of the Written Opinion of the International Searching Authority mailed Apr. 3, 2008 by the State Intellectual Property Office, P.R. China, in PCT/CN2008/000155, 5 pages.

IEEE Std 802.3-2002, "IEEE Standard for Information technology, Telecommunications and information exchange between systems, Local and metropolitan area networks, Specific requirements, Part 3: Carrier sense multiple access with collision detection (CSMA/CD) access method and physical layer specifications" Mar. 8, 2002.

J. Xiang et al., "A Multipletask Load Balancing Algorithm Used in Real-time Cluster System," Computer Engineering vol. 29 No. 12, Jul. 2003.

F. Lin et al. "An Implementation of the Dynamic Loading Balance Cluster," Journal of Xiamen University (Natural Science) vol. 42 No. 4, Jul. 2003.

* cited by examiner

METHOD AND APPARATUS FOR REDUCING SERVICE IMPAIRMENT IN LINK AGGREGATION GROUP

CROSS-REFERENCE TO RELATED APPLICATIONS

This application is a continuation of International Application No. PCT/CN2008/000155 filed Jan. 22, 2008, entitled "Method and Apparatus for Reducing Service Loss in a Link Aggregation Group," which claims priority to the Chinese Patent Application No. 200710001192.8 entitled "Method and Apparatus for Reducing Service Impairment in Link Aggregation Group" filed with the Chinese Patent Office on Jan. 22, 2007, the entire content of both of which are incorporated herein by reference in their entirety.

TECHNICAL FIELD

The disclosed embodiments relate to network communication, and in particular, to a method and apparatus for reducing service impairment in a Link Aggregation Group (LAG).

BACKGROUND

Link aggregation refers to aggregating multiple ports together to form a LAG. FIG. 1 shows a LAG with two ports, where a service packet may be transferred through different ports and the bandwidth is allocated averagely among the ports. Therefore, the bandwidth increases linearly.

Once the port state changes, the ports in the LAG increase or decrease accordingly, and the packet may reselect a sending port. When the packet reselects the sending port, no selection algorithm is defined clearly in the prior art, and the implementation method varies between manufacturers. Generally, the service packets are redistributed according to the current quantity of ports. Consequently, the services on all the ports are disrupted or the service packets are disordered. Some services originally not vulnerable to impact may also change the bearer port, and the services are affected excessively.

SUMMARY

In order to relieve impairment of the services in link aggregation in the prior art in the case of adding or deleting physical ports, a method and apparatus for reducing service impairment in a LAG are provided consistent with some embodiments.

A method for reducing service impairment in a LAG includes:
  dividing a service packet into multiple service sub-flows, and allocating the multiple service sub-flows to physical ports averagely;
  reallocating the service sub-flows consecutively until the quantity of the service sub-flows on each physical port is equalized when the quantity of ports changes; and
  finding, by a service packet, a corresponding forwarding physical port according to the service sub-flow.

An apparatus for reducing service impairment in a LAG is provided. The apparatus may include:
  an initializing module, adapted to: divide a service packet into multiple service sub-flows, and allocate the multiple service sub-flows to physical ports averagely;
  a port processing module, adapted to reallocate the service sub-flows consecutively until the quantity of the service sub-flows on each physical port is equalized when the quantity of ports changes; and
  a forwarding port search module, adapted for a service packet to find a corresponding forwarding physical port according to the service sub-flow.

The technical solution under the embodiments brings the following benefits:
  Consistent with some embodiments, a service packet is divided into multiple service sub-flows, and the service sub-flows are allocated to all physical ports in a LAG averagely. Once a physical port is added or deleted from the LAG, the affected service sub-flows may be operated, and the service packet searches for the port of forwarding the packet according to the service sub-flow, thus minimizing the impact on the service.

DETAILED DESCRIPTION

The disclosed embodiments are hereinafter described in detail with reference to exemplary embodiments and accompanying drawings, but the disclosed embodiments are not limited to the following embodiments.

In the disclosed embodiments, a service packet is divided into multiple service sub-flows, the service sub-flows are allocated to different physical ports averagely, and the service packet is sent out through the physical port corresponding to the service sub-flow. If the state of the physical port changes, namely, if a physical port needs to be added into or deleted from a LAG, the corresponding relation between the affected service sub-flow and the physical port may be modified.

A service packet corresponds to multiple service sub-flows according to the distribution algorithm. The distribution algorithm distributes the service sub-flows according to the destination MAC address field, source MAC address field or combination thereof in the Ethernet packet, or in other modes. The disclosed embodiments do not deal with the specific distribution algorithm.

Embodiment 1

In the initialization, one physical port is set in the LAG, and all service sub-flows are correlated with the physical port. After more physical ports are added, the corresponding relation between the physical port and the service sub-flow is shown in Table 1. If the total number of physical ports is n−(m % n), each port corresponds to m/n service sub-flows, where m % n means m modulus divided by n, and the result of m % n is the remainder of m divided by n. Moreover, among the m % n physical ports, each port corresponds to (m/n)+1 service sub-flows. In order to allocate the service packets among the ports evenly, the quantity of service sub-flows corresponding to one group of ports is one more or less than the quantity of service sub-flows corresponding to the other group of ports in this embodiment, which also applies to adding or deleting a physical port subsequently. However, such an allocation relation is not necessary, and it is also possible that the quantity of service sub-flows corresponding to one group of ports is over one more or less than the quantity of service sub-flows corresponding to the other group of ports.

TABLE 1

| Quantity of service sub-flows | Quantity of physical ports |
|---|---|
| m/n | n − (m % n) |
| (m/n) + 1 | m % n |

Figure 1:
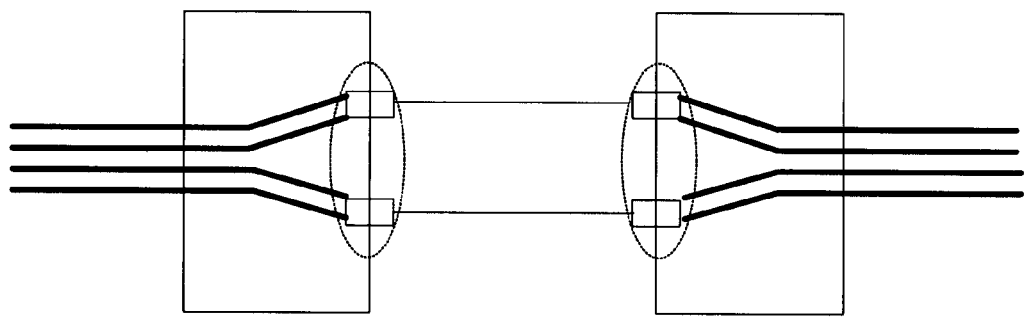
FIG. 1 shows a structure of a LAG in the prior art.
Figure 2:
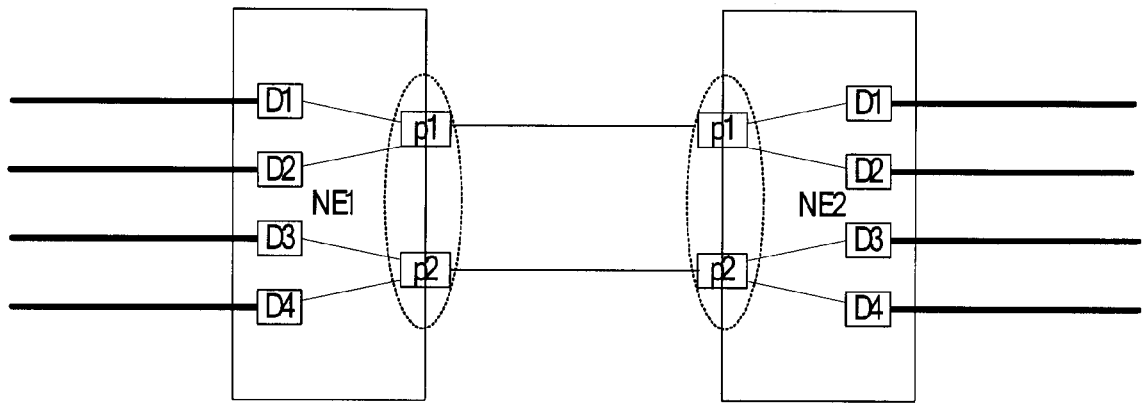
FIG. 2 shows corresponding relations between a service sub-flow and a physical port according to a first embodiment.

Example: As shown in FIG. 2, the service packet on the first Network Element (NE1) and the second NE (NE2) may be divided into four service sub-flows: D1, D2, D3, and D4; and two physical ports P1 and P2 exist in a LAG. According to the corresponding relations in Table 1, if the quantity of service sub-flows is: 4/2=2, the quantity of physical ports is: 2−(4% 2)=2; if the quantity of service sub-flows is (4/2)+1=3, the quantity of physical ports is: 4% 2=0.

Therefore, the corresponding relation between the service sub-flow and the physical port is as follows:

Each physical port has two service sub-flows. That is, service sub-flows D1 and D2 shown in FIG. 2 correspond to the physical port P1, and service sub-flows D3 and D4 correspond to the physical port P2.

After one port is added (only one port can be added at a time), the corresponding relation between each port and each service sub-flow is shown in Table 2:

TABLE 2

| Quantity of service sub-flows | Quantity of physical ports |
|---|---|
| m/(n + 1) | (n + 1) − (m %(n + 1)) |
| (m/(n + 1)) + 1 | m %(n + 1) |

When a physical port is added in the LAG, the change of the existing corresponding relation between the physical port and the service sub-flow may be the minimum. The allocation begins with the port which contains many service sub-flows.

Figure 3:
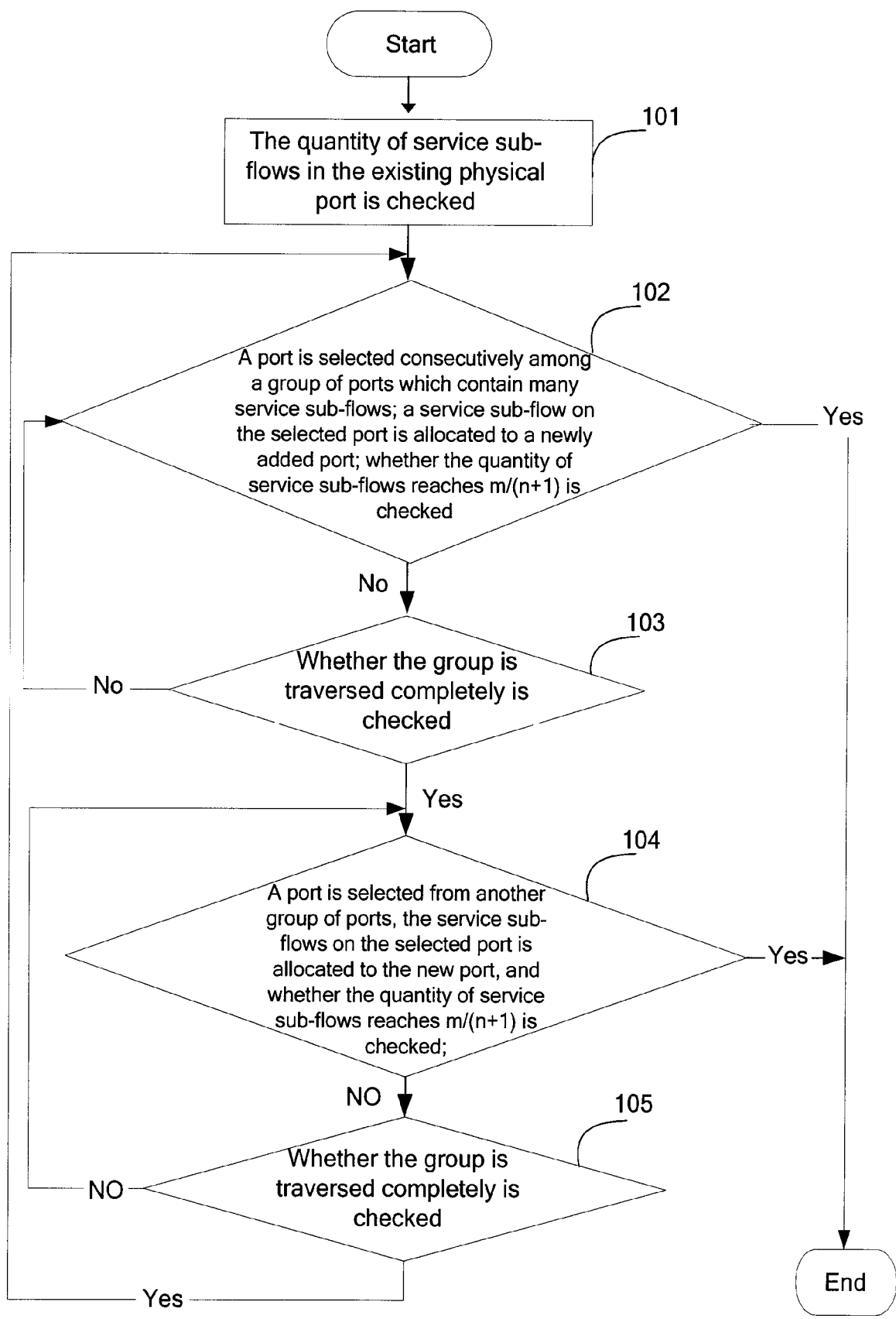
FIG. 3 is a flowchart of a method for reducing service impairment in a LAG according to the first embodiment.

FIG. 3 shows a method for reducing service impairment in a LAG according to some embodiments. The method includes:

Step 101: The quantity of service sub-flows in the existing physical port is checked.

Step 102: A port is selected consecutively in a group of ports which contain many service sub-flows; a service sub-flow on the selected port is allocated to a newly added port; it is checked whether the quantity of service sub-flows in the newly added port reaches m/(n+1) every time after a service sub-flow is added; if the quantity of service sub-flows in the newly added port reaches m/(n+1) every time after a service sub-flow is added, the process is ended; otherwise, the process proceeds to step 103.

Step 103: It is judged whether the group of ports is traversed; and if the group of ports is traversed, the process proceeds to step 104; otherwise, the process returns to step 102.

Step 104: A service sub-flow is selected consecutively in a group of ports which have few service sub-flows, and the service sub-flow is allocated to the newly added port; if the quantity of the service sub-flows in the newly added port reaches m/(n+1), the process is ended; otherwise, the process proceeds to step 105.

Step 105: It is judged whether the group of ports is traversed; if the group of ports is traversed, the process proceeds to step 102; otherwise, the process returns to step 104.

After the service sub-flows are allocated, the service packet finds the corresponding forwarding physical port according to the service sub-flow so as to forward the packet.

Figure 4:
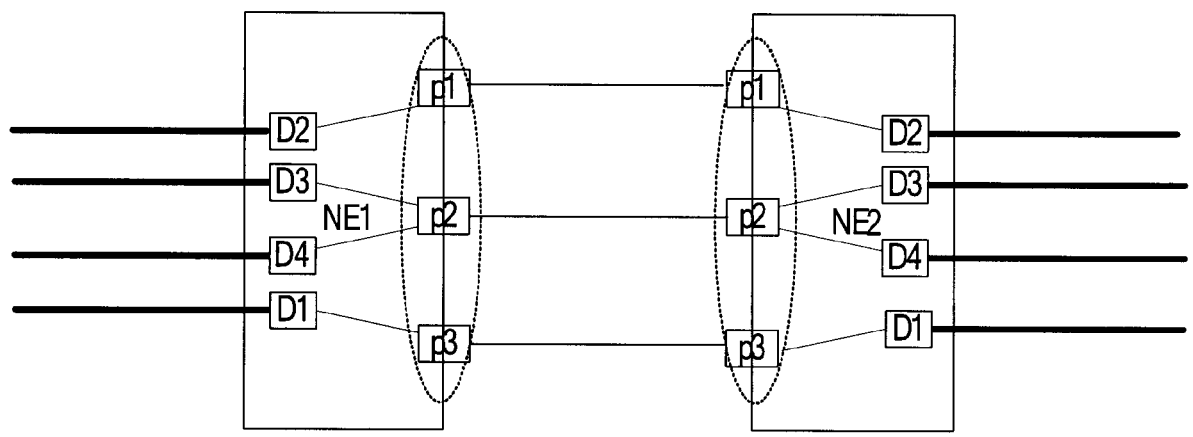
FIG. 4 shows a result of configuring service sub-flows for a new port according to the first embodiment.

Example: Taking the LAG in FIG. 2 as an example, a port P3 is added in the LAG. Both the quantity of service sub-flows on P1 and the quantity of service sub-flows on P2 are 2, and 4% 2 is 0. Therefore, step 103 is performed, and a service sub-flow is removed from P1 first. At this time, the quantity of service sub-flows on P3 is 4/(2+1)=1, and the process is ended. The final result is shown in FIG. 4: P1 contains one service sub-flow (D2), P2 contains two service sub-flows (D3 and D4), and P3 contains one service sub-flow (D1).

Embodiment 2

Figure 5:
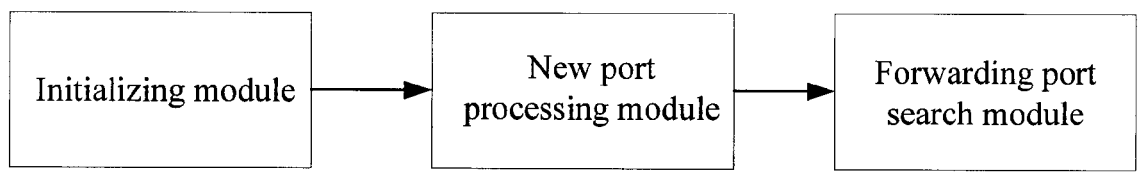
FIG. 5 shows an apparatus for reducing service impairment in a LAG according to a second embodiment.

As shown in FIG. 5, an apparatus for reducing service impairment in a LAG in the second embodiment. The method may include:

an initializing module, adapted to: divide a service packet into multiple service sub-flows, and allocate the multiple service sub-flows to physical ports averagely;

a new port processing module, adapted to: select a physical port with many service sub-flows consecutively according to the allocation result of the initializing module after a new physical port is added, obtain a service sub-flow from the selected physical port, and allocate the service sub-flow to the new physical port until the quantity of service sub-flows on the new physical port reaches the preset quantity; and a forwarding port search module, adapted for a service packet to find the corresponding forwarding physical port according to the service sub-flow.

After multiple service sub-flows are allocated to the physical ports averagely, the maximum difference between the quantity of service sub-flows on one physical port and the quantity of service sub-flows on another physical port is 1.

If the total number of service sub-flows is m and the total number of physical ports is n+1, the preset quantity in a newly added port processing module may be an integer value equal to m divided by n+1.

Embodiment 3

After one port is deleted (only one port can be deleted at a time), the corresponding relation between each physical port and each service sub-flow is shown in Table 3:

TABLE 3

| Quantity of service sub-flows | Quantity of physical ports |
|---|---|
| m/(n − 1) | (n − 1) − (m %(n − 1)) |
| (m/(n − 1)) + 1 | m %(n − 1) |

Figure 6:
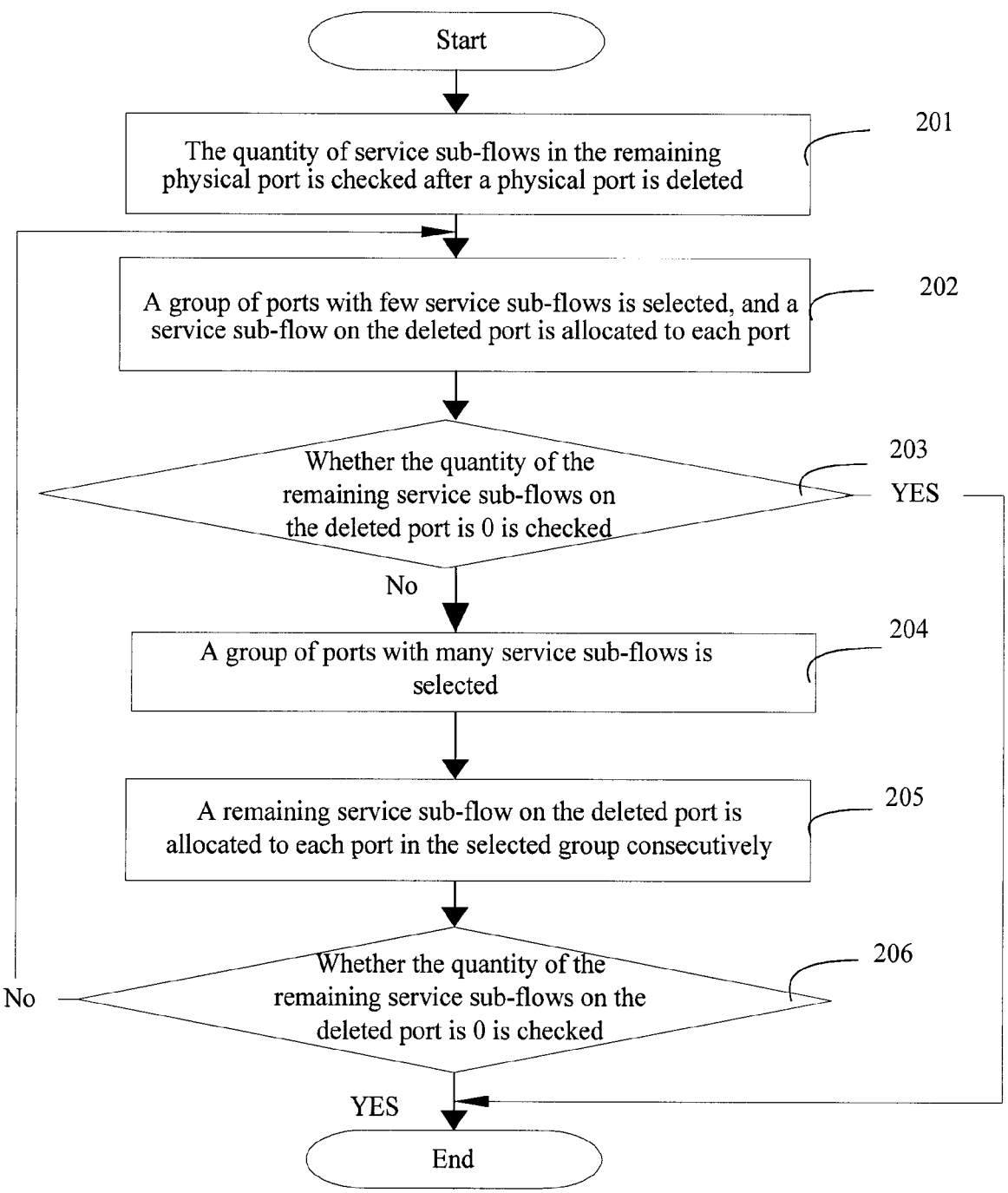
FIG. 6 is a flowchart of a method for reducing service impairment in a LAG according to a third embodiment.

The quantity of service sub-flows released by deleting a port may be m/n or (m/n)+1. As shown in FIG. 6, the released service sub-flows are allocated in the following way:

Step 201: The quantity of service sub-flows in the remaining physical port after a physical port is deleted is checked.

Step 202: A group of physical ports with few service sub-flows are selected, and the service sub-flows on the deleted physical port are allocated to the selected group of physical ports consecutively, where one service sub-flow is allocated to each physical port.

Step 203: It is checked whether the quantity of service sub-flows on the deleted physical port is 0: if the quantity of service sub-flows on the deleted physical port is 0, the process is ended; otherwise, the process proceeds to step 204.

Step 204: A group of physical ports with many service sub-flows are selected in the remaining physical ports after a physical port is deleted.

Step 205: The service sub-flows on the deleted physical port are allocated to a newly selected group of physical ports consecutively, where one service sub-flow is allocated to each physical port.

Step 206: It is checked whether the quantity of service sub-flows on the deleted physical port is 0; the quantity of service sub-flows on the deleted physical port is 0, the process is ended; otherwise, the process proceeds to step 202.

After the service sub-flows are allocated, the service packet finds the corresponding forwarding physical port according to the service sub-flow so as to forward the packet.

Example: Taking the LAG shown in FIG. 4 as an example, if the physical port P1 is deleted from the LAG, the service sub-flow D2 on P1 is allocated to P3; if the physical port P2 is deleted, the service sub-flows D3 and D4 are allocated to P1 and P3.

Embodiment 4

Figure 7:
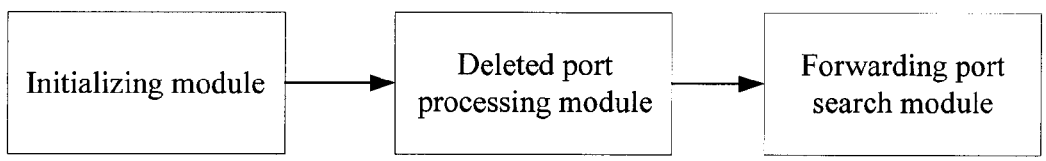
FIG. 7 shows an apparatus for reducing service impairment in a LAG according to a fourth embodiment.

As shown in FIG. 7, another apparatus for reducing service impairment in a LAG in the fourth embodiment includes:
an initializing module, adapted to: divide a service packet into multiple service sub-flows, and allocate the multiple service sub-flows to physical ports averagely;
an deleted port processing module, adapted to allocate the service sub-flows on the deleted physical port to other physical ports allocated by the initializing module averagely in a consecutive way until the quantity of the service sub-flows on the deleted physical port is 0; and
a forwarding port search module, adapted for a service packet to find the corresponding forwarding physical port according to the service sub-flow.

After multiple service sub-flows are allocated by the initializing module to the physical ports averagely, the maximum difference between the quantity of service sub-flows on one physical port and the quantity of service sub-flows on another physical port is 1.

In the foregoing embodiments, a service packet is divided into multiple service sub-flows, and all the service sub-flows are allocated to all physical ports in a LAG averagely. Once a physical port is added or deleted, the affected service sub-flows may be operated, and the service packet searches for the port of forwarding the packet according to the service sub-flow, thus minimizing the impact on the service.

The traffic remains balanced in the operation process. If the quantity of service sub-flows is higher, the traffic corresponding to each service sub-flow is lower, fewer services are affected in the case of modifying the corresponding relation between the service sub-flow and the port, and the equilibrium is better.

Although the embodiments have been described through several preferred embodiments, the disclosed embodiments are not limited to such embodiments. It is apparent that those skilled in the art can make various modifications and variations to the disclosed embodiments without departing from the spirit and scope of the disclosure. The disclosed embodiments are intended to cover the modifications and variations provided that they fall in the scope of protection defined by the following claims or their equivalents.

What is claimed is:

1. A method for reducing service impairment in a Link Aggregation Group (LAG) comprising:
dividing a service packet into multiple service sub-flows;
allocating the multiple service sub-flows to each physical port of a plurality of physical ports such that a maximum difference between a quantity of service sub-flows on one physical port and a quantity of service sub-flows on another physical port is equal to 1;
determining a first group and a second group from the plurality of physical ports, wherein physical ports of the first group have a same number of service sub-flows and physical ports of the second group have a same number of service sub-flows, and the number of service sub-flows on each physical port of the first group is larger than the number of service sub-flows on each physical port of the second group by 1;
adding a new physical port;
selecting one physical port from the first group consecutively;
obtaining one service sub-flow on the selected physical port and allocating the obtained one service sub-flow to the new physical port; and
determining whether a difference between a quantity of service sub-flows on the new physical port and a quantity of service sub-flows on each of the physical ports is equal to or less than 1;
if the difference is equal to or less than 1, ending the allocating process;
if the difference is larger than 1, determining whether the first group is traversed;
if the first group is traversed,
selecting a physical port from the second group consecutively;
obtaining one service sub-flow on the selected physical port and allocating the obtained one service sub-flow to the new physical port; and
determining whether a difference between a quantity of service sub-flows on the new physical port and a quantity of service sub-flows on each of the physical ports is equal to or less than 1;
if the difference is equal to or less than 1, ending the allocating process is ended; and
if the difference is larger than 1, determining whether the second group is traversed;
if the second group is traversed, selecting one physical port from the first group consecutively again, obtaining one of the remaining service sub-flows on the selected physical port and allocating the obtained one of the remaining service sub-flows to the new physical port, and ending the allocating process until the difference is equal to or less than 1; and
forwarding the service packet, according to the corresponding physical ports of the service sub-flows.

2. The method for reducing service impairment in a LAG according to claim 1, wherein the determining whether a difference between the quantity of service sub-flows on the new physical port and the quantity of service sub-flows on each of the physical ports is equal to or less than 1 comprises:
determining whether the quantity of service sub-flows on the new physical port reaches a preset quantity, wherein a total number of the service sub-flows is m, a total number of the physical ports is n+1 after the new physical port is added, and the preset quantity is equal to an integer portion of the result of m divided by n+1.

3. A method for reducing service impairment in a Link Aggregation Group (LAG) comprising:
dividing a service packet into multiple service sub-flows;
allocating the multiple service sub-flows to each physical port of a plurality of physical ports such that a maximum difference between a quantity of service sub-flows on one physical port and a quantity of service sub-flows on another physical port is equal to 1; deleting a physical port;
determining a first group and a second group from the plurality of physical ports, wherein physical ports of the first group have a same number of service sub-flows and physical ports of the second group have a same number of service sub-flows, and the number of service sub-flows on each physical port of the first group is larger than the number of service sub-flows on each physical port of the second group by 1;
obtaining one of the service sub-flows on the deleted physical port and allocating the obtained one of the service sub-flows to the physical ports of the second group consecutively; and
determining whether a quantity of the service sub-flows on the deleted physical port is equal to 0;
if the quantity of the service sub-flows on the deleted physical port is equal to 0, ending the allocating process;
if the quantity of the service sub-flows on the deleted physical port is not equal to 0,
obtaining one of the service sub-flows on the deleted physical port and allocating the obtained one of the service sub-flows to the physical ports of the first group consecutively; and
determining whether a quantity of the service sub-flows on the deleted physical port is equal to 0;
if the quantity of the service sub-flows on the deleted physical port is equal to 0, the process is ended;
if the quantity of the service sub-flows on the deleted physical port is not equal to 0, obtaining one of the remaining service sub-flows on the deleted physical port and allocating the obtained one of the remaining service sub-flows to the physical ports of the second group consecutively again, until the quantity of the service sub-flows on the deleted physical port is equal to 0; and
forwarding the service packet, according to the corresponding physical ports of the service sub-flows.

4. The method for reducing service impairment in a LAG according to claim 2,
wherein the number of the physical ports of the first group is m % n, the number of the physical ports of the second group is n−m % n, where % means modulus division, and the result of m % n is a remainder of m divided by n, and
wherein the allocating the multiple service sub-flows to each physical port of a plurality of physical ports comprises allocating m/n+1 service sub-flows to each physical port of the first group, allocating m/n service sub-flows to each physical port of the second group, where the result of m/n is an integer portion of the result of m divided by n.

5. An apparatus for reducing service impairment in a Link Aggregation Group (LAG) comprising:
an initializing module, adapted to:
divide a service packet into multiple service sub-flows, and
allocate the multiple service sub-flows to all the physical ports,
wherein a difference between a quantity of the service sub-flows on one physical port and a quantity of the service sub-flows on another physical port is equal to or less than 1; and
a new port processing module, adapted to:
determine a first group and a second group from all the physical ports, wherein physical ports of the first group have a same number of service sub-flows and physical ports of the second group have a same number of service sub-flows, and the number of service sub-flows on each physical port of the first group is larger than the number of service sub-flows on each physical port of the second group by 1,
select a physical port from the first group consecutively according to an allocation result of the initializing module after a new physical port is added,
obtain a service sub-flow on the selected physical port and allocate the obtained service sub-flow to the new physical port, and
determine whether the quantity of service sub-flows on the new physical port reaches a preset quantity,
if the quantity of service sub-flows on the new physical port reaches the preset quantity, end the allocating process,
if the quantity of service sub-flows on the new physical port does not reach the preset quantity, determine whether the first group is traversed,
if the first group is traversed,
select a physical port from the second group consecutively,
obtain one of the service sub-flows on the selected physical port and allocate the obtained one of the service sub-flows to the new physical port, and
determine whether a quantity of service sub-flows on the new physical port reaches the preset quantity,
if the quantity of service sub-flows on the new physical port reaches the preset quantity, end the allocating process,
if the quantity of service sub-flows on the new physical port does not reach the preset quantity, determine whether the second group is traversed,
if the second group is traversed, select one physical port from the first group consecutively again,
obtain one of the remaining service sub-flows on the selected physical port and allocate to the new physical port, and end the allocating process when the quantity of service sub-flows on the new physical port reaches the preset quantity; and
a forwarding port search module, adapted to find a corresponding forwarding physical port for the service packet according to the service sub-flows, and to forward the service packet through the corresponding forwarding physical port.

6. The apparatus for reducing service impairment in a LAG according to claim 5, wherein:
a total number of the service sub-flows is m, a total number of the physical ports is n+1 after the new physical port is added, and the preset quantity is an integer value equal to m divided by n+1.

7. The apparatus for reducing service impairment in a LAG according to claim 6,
wherein the number of the physical ports of the first group is m % n and the number of the physical ports of the second group is n−m % n, where % means modulus division, and the result of m % n is the remainder of m divided by n, and
wherein the allocating the multiple service sub-flows to each physical port of a plurality of physical ports comprises allocating m/n+1 service sub-flows to each physical port of the first group and allocating m/n service sub-flows to each physical port of the second group, where the result of m/n is an integer portion of the result of m divided by n.

8. The apparatus for reducing service impairment in a LAG according to claim 5, further comprising:
a deleted port processing module, adapted to:
determine a third group of physical ports and a fourth group of physical ports after a physical port is deleted, wherein physical ports of the third group have a same number of service sub-flows and physical ports of the fourth group have a same number of service sub-flows, and the number of service sub-flows on each physical port of the third group is larger than the number of service sub-flows on each physical port of the fourth group by 1,
obtain one of the service sub-flows on the deleted physical port and allocate the obtained one of the service sub-flows to the physical ports of the fourth group in a consecutive way, and
determine whether the quantity of the service sub-flows on the deleted physical port is equal to 0;
if the quantity of the service sub-flows on the deleted physical port is equal to 0, end the allocating process,
if the quantity of the service sub-flows on the deleted physical port is not equal to 0, obtain one of the service sub-flows on the deleted physical port and allocate the obtained one of the service sub-flows to the physical ports of the third group consecutively, and determine whether a quantity of the service sub-flows on the deleted physical port is equal to 0,
if the quantity of the service sub-flows on the deleted physical port is equal to 0, end the allocating process,
if the quantity of the service sub-flows on the deleted physical port is not equal to 0, obtain one of the remaining service sub-flows on the deleted physical port and allocate the obtained one of the remaining service sub-flows to the physical ports of the fourth group consecutively again, until the quantity of the service sub-flows on the deleted physical port is equal to 0.

9. The apparatus for reducing service impairment in a LAG according to claim 8, wherein:
a total number of the service sub-flows is m, a total number of the physical ports is n+1 after the new physical port is added, and the preset quantity is equal to an integer portion of the result of m divided by n+1.

10. The apparatus for reducing service impairment in a LAG according to claim 9,
wherein the number of the physical ports of the first group is m % n, the number of the physical ports of the second group is n−m % n, where % means modulus division, and the result of m % n is the remainder of m divided by n, and
wherein the allocating the multiple service sub-flows to each physical port of a plurality of physical ports comprises allocating m/n+1 service sub-flows to each physical port of the first group and allocating m/n service sub-flows to each physical port of the second group, where the result of m/n is an integer portion of the result of m divided by n.

* * * * *